United States Patent [19]

Friedman et al.

[11] Patent Number: 4,495,208

[45] Date of Patent: Jan. 22, 1985

[54] SHELF-STABLE HIGH MOISTURE PET FOOD

[75] Inventors: Herman H. Friedman, Forest Hills; Walter R. Popp, Valley Cottage, both of N.Y.

[73] Assignee: General Foods Corporation, White Plains, N.Y.

[21] Appl. No.: 540,901

[22] Filed: Oct. 11, 1983

Related U.S. Application Data

[63] Continuation of Ser. No. 353,291, Mar. 1, 1982, abandoned, which is a continuation of Ser. No. 158,014, Jun. 7, 1980, abandoned.

[51] Int. Cl.$^3$ ................................................ A23K 1/00
[52] U.S. Cl. ........................................ 426/335; 426/72; 426/74; 426/532; 426/623; 426/630; 426/805
[58] Field of Search ............... 426/332, 335, 532, 805, 426/72, 74, 623, 630

[56] References Cited

U.S. PATENT DOCUMENTS

| | | | |
|---|---|---|---|
| 3,202,514 | 8/1965 | Burgess et al. | 426/532 |
| 3,658,548 | 4/1972 | Haas | 426/532 |
| 3,985,904 | 10/1976 | Bernotavicz | 426/332 |
| 4,011,346 | 3/1977 | Ernst | 426/805 X |
| 4,143,171 | 3/1979 | Buckley et al. | 426/331 |
| 4,158,706 | 6/1979 | Ernst et al. | 426/332 X |
| 4,191,783 | 3/1980 | Burkwall et al. | 426/805 X |
| 4,212,894 | 7/1980 | Franzen et al. | 426/332 |

*Primary Examiner*—R. B. Penland
*Attorney, Agent, or Firm*—Thomas R. Savoie; Thomas A. Marcoux; Daniel J. Donovan

[57] ABSTRACT

The object of the invention is to provide a palatable, high-moisture pet food which is reliably stable against microbial attack without need to resort to pasteurization.

This objective has long been sought by the art and is now met by the pet food provided by the invention which is a nutritionally-balanced pet food comprising protein, fat, carbohydrates, vitamins and minerals, has a moisture content within the range of from 50 to 80%, exhibits a water activity of at least 0.90, and further comprises on a total weight basis from 4% to 15% fructose; from 0.3% to 3.0% of an edible organic acid and sufficient inorganic acid to maintain the pH of the product within the range of from 3.5 to 5.8; and an antimycotic in an amount which is effective to prevent mold growth wherein the preservation system is bactericidal.

According to a preferred embodiment the binders comprises carageenan and the organic acid is selected from the group consisting of heptanoic, octonoic, nonanoic and combination of these.

8 Claims, No Drawings

SHELF-STABLE HIGH MOISTURE PET FOOD

This application is a continuation of application Ser. No. 353,291, filed Mar. 1, 1982 which was in turn a continuation of application Ser. No. 158,014, filed June 7, 1980, both now abandoned.

TECHNICAL FIELD

The present invention relates to pet foods, and particularly to a palatable, high-moisture pet food which is reliably stable against microbial attack, under conditions normally encountered in commercial distribution and storage, without any need to resort to puncture proof packaging or pasteurization.

The advent of intermediate-moisture pet foods, such as those described by Burgess et al in U.S. Pat. No. 3,202,514, made possible the convenient feeding of meaty rations without the disadvantages associated with cans. These intermediate-moisture products were more palatable than dry pet foods, yet still did not have the high moistures of fresh and canned meats. It was thought necessary to the obtainment of a palatable, microbiologically-stable ration, to reduce the water content significantly and then add large amounts of water-soluble solids to further bind the water. Products which were stable at higher water contents were no longer palatable because of the preservatives added, and products which were palatable at those higher moistures were not reliably stable under commercial conditions.

BACKGROUND ART

The desire for a practical high-moisture, yet shelf-stable pet food has been discussed in the prior art for years. The standard, however, for commercial products has remained intermediate moisture products of the type discussed by Burgess et al in U.S. Pat. No. 3,202,514. These products typically have moisture contents of less than 30% and have sufficient amounts of solids to reduce the water activity to below about 0.88. The soluble solids will typically include salt, sugars and polyhydric alcohols. In addition, antimicrobials, such as sorbic acid and its edible salts, are typically employed to protect the food against attack by molds and other organisms not controlled by low water activity. This is especially important where heating followed by condensation, or other such changes which may occur as the normal consequence of commercial shipping and storage during which the product may be subjected to extremes of temperature and humidity, can cause a localized imbalance in the water activity in the product. Some patents, such as U.S. Pat. No. 3,658,548 to Haas have described other antimicrobials for use in products of this type in place of the sorbates. Haas discloses that caproic (hexanoic) and caprylic (octanoic) acids are effective antimycotics at levels of 0.3 percent or less in products containing from 15 to 30 percent moisture and a level of soluble solids at least equal to the level of moisture. In U.S. Pat. No. 4,002,775, Kabara identifies other food-grade antimicrobials based on fatty acids.

In one departure from the conventionally lower-moisture products, Bernotavicz, in U.S. Pat. No. 3,985,904 describes what is said to be a high-moisture, shelf stable product. This product contains at least 50% cooked meat and greater than 50 percent moisture. It has a water activity of greater than 0.90 and further contains from 1 to 35 percent gelatinized starch, a low level of an antimycotic, and from 1.7 to 3.8 percent of an acid which maintains the pH within the range of from 3.9 to 5.5. However, when the product of that invention was tested, it did not prove reliably stable.

Also, Ernst et al disclose a high-moisture pet food in U.S. Pat. No. 4,158,706, which is said to be stable against microbial attack without pasteurization when packaged in transparent, flexible containers. The food is disclosed as containing at least 50 percent water, a binder and from 0.5 to 5.0 percent of an acid selected from the group consisting of succinic acid, pyruvic acid, and fumaric acid.

DISCLOSURE OF INVENTION

In accordance with the present invention, an improved high moisture pet food is provided. The pet food of the invention is highly-palatable, nutritionally-balanced, and reliably-stable against microbial attack under conditions normally encountered in commercial distribution and storage without any need to pasteurize the product or package it in a puncture-proof container. The term reliably stable as used in the description, means that the pet food will remain stable against microbial attack even after the pet food has been innoculated with common contaminants. The prior art has heretofore provided bacteriostatic perservation systems which merely inhibited or slowed down bacteria growth. The present invention provides a preservation system that acts as a bactericide. A bactericide preservation system inactivates and kills bacteria. The pet food contains sufficient protein, fat, carbohydrates, vitamins and minerals to meet the entire nutritional requirements of the intended specie of pet, has a moisture content within the range of from 50 to 80% and a water activity of at least 0.90, and further comprises, on a total weight basis from 4% to 15% fructose; from 0.3% to 3.0% of an edible organic acid and sufficient inorganic acid to maintain the pH of the product within the range of from 3.5 to 5.8; and an antimycotic in an amount which is effective to prevent mold growth wherein the preservation system is bactericidal.

The term "pet" as used in this description, means small to moderate-sized carnivorous animals of the types which are normally domesticated and maintained as household companions. Particularly, the description will focus on foods especially formulated to meet the nutritional requirements of dogs and cats. It is essential for all pet rations to meet the entire nutritional requirements of the intended specie. By nutritionally balancing each pet ration, the pet owner is relieved of the burden of balancing the quantities of different foods supplied. And, the pet is relieved of the consequences which would normally flow from an unbalanced diet. The proper nutritional intake of the pet is assured as long as it intakes a minimum amount of food. Nutritionally-balanced pet foods contain protein, carbohydrates, fats, vitamins and minerals in the amounts known to the art and established by feeding tests to be sufficient for the proper growth and maintenance of the intended specie.

The preferred dog and cat foods of the present invention will contain a proteinaceous matrix which typically contains meaty materials. These meaty materials are preferably comminuted as by grinding in one or a series of stages. Useful as "meaty materials" are "meat", "meat by-products" and "meat meal". Of these the "meat" and "meat by-products" will usually be ground. The term "meat" is understood to apply not only to the flesh of cattle, swine, sheep and goats, but also horses, and other mammals, poultry and fish. The term "meat by-product" is intended to refer to those non-rendered parts of the carcass of slaughtered animals including, but not restricted to, mammals, poultry and the like. Both the terms "meat" and "meat by-products" include such ingredients as are embraced by the terms as defined in the official publication of the Association of American Feed Control Officials, Incorporated. The term "meat meal" refers to the finely ground, dry, rendered residue from animal tissues, including those dried residues embraced by the term "meat meal" as defined by the aforesaid Association.

The meaty material will preferably constitute a portion of pet food products, however, the pet food may be totally non-meaty materials and have an absence of expanded protein materials. Contrary to the prior art, the product of the present invention may contain less than 50% cooked meat. Typically, meaty materials will be employed in amounts greater than about 5% by weight of total product and most preferably be greater than 10%. A usual range for meaty ingredients in the pet food is about 10% to 40%, preferably 20% to 30%, by weight.

Non-meat proteinaceous materials, i.e., protein sources other than meaty materials, are preferably employed to achieve a fully-balanced, nutritional feed ration, or can be employed in place of the meaty materials. Typically, the protein will be derived from a vegetable protein source such as soybean, cottonseed, peanuts and the like. The protein may be present in the form of grits, meal, flour, soy concentrate, soy isolate or the like. Additional protein and flavor may be derived from the meat meal and milk products such as dried buttermilk, dried skimmed milk, whey, casein and other like protein sources, such as eggs or cheese.

The pet foods of the invention are termed high moisture because they contain from 50% to 80% moisture,- this range being higher than the 15% to 30% typical of intermediate-moisture pet foods. The more preferred products of the invention, in terms of meeting palatability, nutrition, and stability standards acceptable to the industry will have moisture contents within the range of from 50% to 70%. The most preferred products will have moisture contents within the range of from 55% to 65%. Products within this later range not only exhibit highly desired moisture levels in a stable, nutritious and meat-like cohesive product, but can derive the major amount of their protein from meaty materials.

The stability of this high moisture food is critically related to the acid, sugar, and antimycotic. It is postulated that the acid, sugar, and antimycotic act synergistically within the preservation system to make it bactericidal. This means that even after inoculation with common bacterial contaminants, the preservation system inactivates the contaminants to remain reliably stable. Thus, in accordance with the present invention, a unique bactericidal preservation system has been formulated which comprises on a total weight basis from 4% to 15% fructose, from 0.3% to 3.0% of an edible organic acid and sufficient inorganic acid to maintain the pH of the product within the range of from 3.5 to 5.8, and an antimycotic in an amount which is effective to prevent mold growth.

The organic acid must be edible and be present in an amount within the range of from about 0.3% to about 3.0%. Among the useful acids are those selected from the group consisting of citric, tartaric, gluconic, fumaric, glutaric, lactic, succinic, adipic, propionic, butyric, pentanoic, hexanoic, heptanoic, octanoic, nonanoic, decanoic, undecanoic, dodecanoic, lauric, and combinations of any of these with others of these or still other edible acids. The more preferred acids are those selected from the group consisting of heptanoic, octanoic, and nonanoic. The organic acids may be employed in combination with inorganic acids to adjust the final pH. However, the addition of inorganic acid may not be required in all cases to maintain the pH of the product within the range of from 3.5 to 5.8. Preferably the pH is maintained within the range of from 3.5 to 5.6 Among those inorganic acids used are phosphoric and hydrochloric acids. The exact level of total acid will depend on the moisture content of the system, the level of sugar, carbohydrate binder, protein, and the type of acid employed.

A particularly preferred combination will comprise octanoic and phosphoric acids, with both being present at levels of at least 0.3%. The preferred range of pH from 3.5 to 5.6 can be maintained with good product performance by employing a combined level of octanoic and phosphoric acids within the range of from 1.0% to 2.0%. The phosphoric acid is a preferred acid because it is a good source of dietary phosphorous. The octanoic acid is also preferred because of its synergistic effect with the sugar, and antimycotic, as well as its ability to provide antimicrobial, antimycotic and antimite activity. Accordingly, an amount of octanoic acid within the range of from 0.3% to 1.5% is advantageous for a number of reasons and does much to enable the realization of a high moisture pet food which is not only reliably stable, but is also palatable for dogs and cats.

The sugars are important for a number of reasons including reduction of the water activity of the product, improving the palatability especially for dogs, and providing microbiological stability by synergistically acting with the acid and antimycotic. Preferred sugars are fructose and highly converted corn syrups, especially high fructose corn syrups. The fructose and high fructose corn syrups appear especially effective in controlling and eliminating the microbiological growth in the product formulation of the invention. The high fructose corn syrups are further preferred because they are highly soluble, and remain in solution under the extremes of temperature normally encountered in commercial distribution and storage of pet food products. The synergistic action among the sugar, acid, and antimycotic has been shown to occur specifically with fructose. Other sugars such as glucose, maltose, manose, and sucrose have been found not to be effective in synergistically acting with the acid and antimycotic. However, those skilled in the art will appreciate that such sugars would be useful in any product formulation for providing effective water binding and contribute to increasing the osmotic pressure of the aqueous system.

The pet foods of this invention contain at least 4% but less than 15% sugar on a dry solids weight basis. Thus, for example where the preferred fructose is employed as a high fructose corn syrup comprising 80% solids, of which 90% is fructose, the amount of corn syrup would be from 5% to 18.75%. In this example, the level of fructose would be between 3.6 and 13.5%. A more preferred range of fructose content is from 7 to 14%, with a maximum of about 10% being most preferred.

The sugar, acid, and other soluble materials will be effective to reduce the water activity of the pet foods of the invention from unity, but will not reduce it below 0.90. The water activity, $a_W$, of a food is well understood in the art to be the ratio of the equilibrium vapor pressure exhibited by the food product at a reference temperature, to the equilibrium vapor pressure of pure water at that same temperature. At these high water activities within the range of from 0.92 to 0.98 it is clearly critical that the microbiological growth control system be unfailingly effective, because any localized or other failure in the system could result in spoilage of the food. The more preferred products of the present invention are especially surprising when viewed from this standpoint, because they not only remain stable under the rigors of commercial distribution and storage, but are bacteriocidal under these conditions. The products are reliably stable and unfailingly effective in prohibiting microbial growth. Reliably stable is defined as having the ability to remain shelf stable even after being inoculated with microorganisms. Thus, the products of the invention can be packaged in any suitable container such as a simple plastic pouch, without any need to take special precautions against punctures which may cause excessive, local concentrations of bacteria to enter the package. The preferred products of the invention do not permit spoilage even under these conditions, and are further surprising because they achieve the high level of safety in a product which is high in moisture and highly palatable.

The pet foods of the invention will also contain an antimycotic in an amount effective to prevent the growth of molds. Typically, the antimycotic will be a material selected from the group consisting of sorbic acid and its edible salts, and will be employed at a level within the range of from 0.1 to 0.5%. Other effective antimycotics can also be employed, and the level will not generally exceed 1%.

The antimycotic synergistically acts within the preservation system to provide stability even after inoculation. No criticality is placed upon the type of antimycotic, but its presence is required within the preservation system.

The pet food compositions of this invention will usually contain a binder and/or polysaccharides in an amount effective to form a cohesive mass. Among the suitable binders will be the various natural and modified gums. High molecular weight polysaccharides known to the art for having good aggregating properties in proteinaceous systems, especially at the relatively low pH values contemplated are preferred. Specifically identified as suitable polysaccharides are ionic polysaccharides such as the various carageenans, pectins, alginates, and the like. Preferred among these are pectin, especially low-methoxyl pectin, and carageenans. Most preferred is carageenan. The binder and polysaccharide are capable of forming a cohesive mass upon heat setting which will retain its shape within the temperature range of from 0° C. to 50° C. and is employed in an amount effective to meet this capability. While the proper level of polysaccharide will vary with formulation, especially water content and protein type, levels within the range of from about 1.5% to about 3.0% are most preferred. The polysaccharides are preferred not only for their good shape retention properties, but because they seem to enhance the overall effectiveness of the preservation system. Other suitable binders are coagulable proteinaceous materials such as caseinates, gluten, modified soy proteins and the like, which can be employed to enhance cohesiveness; however, this is not essential.

The various materials are preferably processed and packaged according to procedures known in the art, such as described in U.S. Pat. No. 3,202,514 to Burgess et al. The disclosure of that patent is therefore incorporated herein by reference, to show the general scheme for processing and packaging soft, moist pet foods. While the process for forming the product of the present invention differs from Burgess et al because of the need for additional binding agents because of the high moisture content, those skilled in the art are well aware of the manner of using the binders and/or polysaccharides and heat-coagulable proteins needed to provide cohesiveness. The following examples describe exemplary processing schemes for preparing pet foods according to the invention.

BEST MODE FOR CARRYING OUT THE INVENTION

The following Examples are for the purpose of further illustrating the present invention and are not to be taken as limiting in any regard. Unless otherwise indicated, all parts and percentages are by weight.

EXAMPLE 1

According to this example, a 60%-moisture dog food according to the present invention having an $a_W$ of about 0.94 and a pH of about 5.0 is prepared from the following ingredients:

| Dry Mix | |
| --- | --- |
| Ingredients | Parts by Weight |
| Wheat gluten | 10.0 |
| Soybean oil meal | 4.0 |
| Fish meal | 1.0 |
| Whole corn | 1.0 |
| Vitamin, mineral pre-mix | 3.6 |
| Poultry meal | 3.0 |

| Wet Mix | |
| --- | --- |
| Ingredients | Parts by Weight |
| Carageenen | 2.0 |
| Isomerose 900 brand high fructose corn syrup (72% fructose) | 15.0 |
| Flavor | 6.15 |
| Bleachable fancy tallow | 7.0 |
| Octanoic acid | 0.30 |
| Potassium sorbate | 0.17 |
| Water | 48.93 |

The high fructose corn syrup and 30 parts of the water are admixed with the carageenan in a bowl mixer and blended therein to prepare a first uniform liquid. The remainder of the wet mix is then blended with the remaining water, and the resulting blend is added to the first uniform liquid. The dry mix ingredients are dry blended and then added to the combined liquid blend to form a fluid mix which is mixed until homogeneous. The fluid mix is transferred to a pan which is covered and heated in an autoclave with steam at a pressure of 15 psig (117° C.) for about 25 minutes. Upon cooling, the resulting product has a cohesive, meat-like texture.

EXAMPLE 2

The procedure of Example 1 is repeated using the following ingredients:

| Dry Mix | |
|---|---|
| Ingredients | Parts by Weight |
| wheat gluten | 10.0 |
| Soy isolate | 9.0 |
| Fish meal | 1.0 |
| Vitamin, mineral pre-mix | 2.6 |

| Wet Mix | |
|---|---|
| Ingredients | Parts by Weight |
| Carageenan | 2.0 |
| Isomerose 900 brand high fructose corn syrup 72% fructose) | 15.0 |
| Flavor and color | 6.15 |
| Bleachable fancy tallow | 5.0 |
| Heptanoic acid | 0.5 |
| Potassium sorbate | 0.17 |
| Water | 48.58 |

Again the product has a meat like cohesiveness, and a moisture content of about 60%.

EXAMPLE 3

Another product according to the present invention is prepared, this time using the following formulation:

| Ingredients | Parts by Weight |
|---|---|
| Wheat gluten | 10.0 |
| Ground whole chicken | 10.0 |
| Vitamin, mineral pre-mix | 2.6 |
| Carageenan | 2.0 |
| Fructose | 12.0 |
| Flavor and color | 6.0 |
| Bleachable fancy tallow | 5.0 |
| Nonanoic acid | 0.3 |
| Potassium sorbate | 0.17 |
| Water | 52.0 |

The ground whole chicken, fructose and carageenan are blended with 40 parts of the water in a bowl blender until homogeneous. The remaining 12 parts of water are then added with the remaining ingredients and blended to form a uniform mix. The uniform mix is extruded in a heated screw extruder with sufficient heat in the process to produce a meat-like cohesive textured product having a moisture content of from 60% to 65%.

EXAMPLE 4

This example describes the preparation and testing of a number of product samples containing the following ingredients in the listed amounts or within the following ranges:

| Ingredient | Parts by Weight |
|---|---|
| Protein (54.2% Soy Grits and 45.8% Wheat Gluten) | 19.7 |
| Potassium Sorbate | 0.3 |
| Isomerose 900 brand high fructose corn syrup | 1.5–20 |
| Octanoic Acid | 0–1.5 |
| Phosphoric Acid | 0–4.5 |
| Carageenan | 0–2.5 |

These products are listed in the following table along with the final product moisture contents, pH, $a_W$ and stability (0=no significant microbial growth; 1=significant microbial growth). The stability was determined on the basis of expert judgment after a 20 week study, wherein the samples were inoculated and examined as follows.

All samples were inoculated with a suspension of Lactobacilli, Staphylococci, yeast and mold. The samples were stored in quart glass jars and analyzed at 0, 1, 2, 4, 8, 12, 16 and 20 weeks. Analysis included plating on Standard Plate Count agar (SPC), MRS Lactobacilli agar, Baird Parker agar (BP) for Staphylococci, Anaerobic agar (ANA), Potato Dextrose Agar (PDA), and Malt and Salt agar for molds and yeasts. Significant microbial growth is defined to be a one (1) log increase of the original measured organism count.

TABLE 1

| Octanoic Acid | $H_3PO_4$ | Carrageenan | Isomerose | Water | pH | $a_W$ | Stability |
|---|---|---|---|---|---|---|---|
| 0.397 | 1.191 | 0.661 | 11.647 | 66.102 | 4.0 | 0.970 | 0 |
| 0.397 | 1.191 | 1.911 | 16.647 | 59.852 | 3.9 | 0.958 | 0 |
| 1.500 | 0.000 | 0.000 | 20.000 | 58.500 | 5.6 | 0.970 | 0 |
| 0.397 | 1.191 | 1.911 | 10.397 | 66.102 | 3.6 | 0.940 | 0 |
| 1.500 | 0.000 | 2.500 | 20.000 | 56.000 | 5.4 | 0.935 | 0 |
| 0.000 | 0.000 | 2.500 | 7.500 | 70.000 | 6.2 | 0.971 | 1 |
| 0.750 | 0.000 | 1.250 | 14.000 | 64.000 | 5.6 | 0.970 | 1 |
| 1.500 | 0.000 | 0.000 | 8.500 | 70.000 | 5.5 | 0.975 | 1 |
| 0.000 | 0.000 | 0.000 | 10.000 | 70.000 | 5.6 | 0.968 | 1 |
| 1.147 | 1.191 | 0.661 | 16.647 | 60.352 | 3.5 | 0.925 | 0 |
| 0.000 | 0.000 | 2.500 | 20.000 | 57.500 | 6.2 | — | 1 |
| 0.000 | 0.000 | 0.000 | 20.000 | 60.000 | 6.4 | 0.960 | 1 |
| 1.500 | 0.000 | 2.500 | 6.000 | 70.000 | 5.4 | 0.950 | 0 |
| 1.147 | 1.191 | 1.911 | 9.647 | 66.102 | 4.1 | 0.975 | 0 |

EXAMPLE 5

According to this example, a cat food product according to the present invention is prepared from the following ingredients:

| Ingredients | Parts by Weight |
|---|---|
| Wheat gluten | 50 |
| Soy Bean Oil Meal | 20 |
| Poultry Meal | 20 |
| Whole Corn | 5 |
| Pre-Mix | 17.9 |
| Bleachable Fancy Tallow | 25 |
| Carrageenan | 10 |
| Heptanoic Acid | 15 |
| Isomerose "900" (72% Fructose) | 75 |
| Water | 260.85 |
| Potassium Sorbate | 1.25 |
| | 500.00 |

The Isomerose "900" (high fructose corn syrup) is mixed with all of the water in addition to carrageenan until a uniform liquid is obtained. (A slight amount of beating may be necessary for uniform liquification.) The remaining liquid fractions, bleachable fancy tallow (liquid state) and heptanoic acid are blended into the uniform liquid. The dry ingredients are dry blended and then added to the liquid blend to form a uniform fluid mix. The mix is then adjusted to pH 4.5 (from a pH 5.2) with 25% phosphoric acid solution. The adjusted fluid mix is transferred to a pan which is then covered and autoclaved with steam at 15 psig (117° C.) for 20 minutes. On cooling, the resultant heat set product has a cohesive, meat-like texture.

EXAMPLE 6

Another cat food formulation according to the present invention is prepared according to the following:

| Ingredients | Parts by Weight |
| --- | --- |
| Poultry Meal | 20 |
| Whole Corn | 5 |
| Pre-Mix | 18 |
| Wheat Gluten | 50 |
| Soy Bean Oil Meal | 20 |
| Carrageenan | 10 |
| Bleachable Fancy Tallow | 25 |
| Potassium Sorbate | 1.5 |
| Nonanoic Acid | 10 |
| Isomerose (72% fructose) | 75 |
| Water | 265.5 |
| | 500.0 |

Carrageenan is added to the water and heated to dissolve until a uniform solution is obtained. The Isomerose "900" solution (72% fructose) is mixed until a uniform liquid is obtained. The nonanoic acid potassium sorbate and liquified bleachable fancy tallow are then blended after which the remaining solid ingredients (after dry blending) are added until a uniform fluid mix is obtained. The pH of the mix (ca 5.2–5.4) is then adjusted to pH 4.5 using a 25% phosphoric acid solution. The final mix is placed in any convenient container covered and autoclaved with steam at 15 psig (117° C.) for 25 minutes. The cooled product has been heat set and shows a meat-like, cohesive texture.

EXAMPLE 7

A cat food gravy having a 70% moisture and having less than 50% cooked meat may be used in combination with other high moisture products is prepared from the following ingredients:

| Ingredients | Parts by Weight |
| --- | --- |
| Water | 780.0 |
| Isomerose "900" (72% Fructose) | 180.0 |
| Kelcosol ® (Sodium alginate) | 1.2 |
| Atmul 500 (Emulsifier) | 6.0 |
| Potassium Sorbate | 3.6 |
| Octanoic Acid | 8.4 |
| Caramel Color | 5.0 |
| Bleachable Fancy Tallow | 84.0 |
| Meat and bone meal | 84.0 |
| Brewers yeast | 12.0 |
| Whole Egg solids | 12.0 |
| Dried whey | 12.0 |
| Corn Flour | 12.0 |
| | 1200.2 |

The Isomerose "900" (72% fructose) is mixed with the water and heated to 60° C. Kelcosol is added slowly with thorough mixing until a uniform liquid is obtained. The emulsifier, Atmul 500 is added with good mixing followed by potassium sorbate until dissolved. The liquified bleachable fancy tallow is then blended with the above liquid mix along with the octanoic acid. The remaining dry ingredients are blended dry and added to the liquid mix and blended until a uniform liquid gravy is obtained. The gravy is then adjusted to the desireable pH with phosphoric acid. This gravy may then be mixed with kibs to form a shelf stable pet food product.

EXAMPLE 8

Another product according to the present invention is prepared this time using the following formulation:

| Ingredients | Parts by Weight |
| --- | --- |
| Water | 108.0 |
| Carrageenan | 4.4 |
| Isomerose "900" (72% Fructose) | 34.0 |
| Wheat gluten | 22.8 |
| Soy grits | 27.0 |
| Potassium Sorbate | 0.34 |
| Octanoic Acid | 3.0 |
| | 199.5 |

Carrageenan is added to the heated water (60° C.) and mixed until a uniform liquid mix is obtained. Isomerose "900" (72% fructose) is mixed with the above liquid until uniform. Potassium sorbate and octanoic acid are then added in addition to a dry mix of wheat gluten and soy grits until the mix is uniform. The pH is adjusted to pH 5.0 from 5.3 with phosphoric acid after which the total mix after covering in a containter is autocleaved with steam at 15 psig (117° C.) for 25 minutes. The cooled heat-set product is cohesive and meat-like in texture.

EXAMPLE 9

Another pet food product according to the present invention is prepared, this time by using the following formulation:

| Ingredients | Parts by Weight |
| --- | --- |
| Wheat gluten | 12.0 |
| Soybean oil meal | 6.0 |
| Meat meal | 1.5 |
| Whole Corn | 1.5 |
| Poultry meal | 4.5 |
| Bleachable fancy tallow | 7.5 |
| Potassium sorbate | 0.45 |
| Carrageenan | 3.0 |
| Isomerose "900" (73% Fructose) | 25.0 |
| Octanoic acid | 0.53 |
| Heptanoic acid | 0.53 |
| Water | 87.50 |
| | 150.01 |

Isomerose "900" (72% fructose) is added to the water and the solution is heated to 60° C. before the addition of the carrageenan. The liquid mix is blended until uniform. Potassium sorbate, octanoic acid, heptanoic acid and liquified bleachable fancy tallow are added to the liquid and mixed until a uniform fluid mix is obtained. The dry blended ingredient mix is added to the fluid mix until uniform. The pH is then adjusted from 5.3–5.4 to 5.0 using phosphoric acid. The final mix is placed in a covered pan and autoclaved for 25 minutes using wet steam at 15 psig (117° C.) The cooled heat set product exhibits good cohesiveness and meat-like texture.

The above description is for the purpose of teaching those skilled in the art how to practice the present invention and is not intended to recite all of the possible modifications and variations which will become apparent to the skilled worker upon reading. It is intended, however, that all such modifications and variations be included within the scope of the invention which is defined by the following claims.

We claim:

1. A moist, microbiologically-stable, nutritionally-balanced pet food comprising water, protein, fat, carbohydrates, vitamins and minerals and a bactericidal preservation system wherein the pet food has a moisture content of from 50% to 80% by weight and a water activity of from 0.92 to 0.98 and reamins stable, without pasteurization, against the growth of bacteria and mold, and further comprising a preservation system consisiting of, on a total weight basis, from 4 to 15% sugars selected from the group consisting of fructose and high fructose corn syrup solids, from 0.3 to 3% of an edible organic acid selected from the group consisting of heptanoic, octanoic and nonanoic acid and combinations thereof, sufficient inorganic acid to maintain the pH of the pet food within the range of from 3.5 to 5.8, from 1.5 to 3% of a high molecular weight ionic polysaccharide selected from the group consisting of carageenans, pectins and alginates and from 0.1 to 0.5% of an antimycotic seleted from the group consisting of sorbic acid and the edible salts thereof.

2. A pet food according to claim 1 wherein the inorganic acid comprises phosphoric or hydrochloric.

3. A pet food according to claim 2 wherein octanoic acid is present in an amount within the range of from 0.3 to 1.5%.

4. A pet food according to claim 2 wherein the ionic polysacchararide comprises a member selected from the group consisting of carageenan and pectin.

5. A pet food according to claim 1 wherein the fructose is present in an amount within the range of from 7 to 14%.

6. A pet food according to claim 5 wherein the fructose is present in an amount within the range of from 7 to 10%.

7. A pet food according to claim 1 wherein the moisture content is within the range of from 50 to 70%.

8. A pet food according to claim 1 wherein the moisture content is within the range of from about 55 to about 65%.

* * * * *